United States Patent [19]
Koutsky et al.

[11] Patent Number: 4,890,887
[45] Date of Patent: Jan. 2, 1990

[54] SUSPENSION SEAT FOR VEHICLES WITH RESTRICTED OPERATOR ENVIRONMENT

[75] Inventors: L. John Koutsky, Milan, Ill.; J. Scott Shovar, Davenport, Iowa

[73] Assignee: Sears Manufacturing Company, Davenport, Iowa

[21] Appl. No.: 319,763

[22] Filed: Mar. 6, 1989

[51] Int. Cl.[4] ............................................. A47C 1/032
[52] U.S. Cl. ................... 297/320; 297/322; 297/342
[58] Field of Search ............... 297/317, 320–322, 297/345, 329, 342, 341; 248/423

[56] References Cited

U.S. PATENT DOCUMENTS

| | | | |
|---|---|---|---|
| 942,818 | 12/1909 | Flindall | 297/320 |
| 2,021,120 | 11/1935 | Wilkins | 297/320 X |
| 2,393,242 | 1/1946 | Flogaus | 297/357 X |
| 3,303,308 | 11/1942 | McArthur | 297/320 X |
| 4,561,621 | 12/1985 | Hill | 248/423 X |
| 4,648,654 | 3/1987 | Voss | 297/317 X |
| 4,684,100 | 8/1987 | Grassl | . |
| 4,687,250 | 8/1987 | Esche | 297/320 |

Primary Examiner—Peter R. Brown
Attorney, Agent, or Firm—Henderson & Sturm

[57] ABSTRACT

This invention provides improved seating for vehicles having cramped space for operators. A tubular frame (12) is disposed to the periphery of backrest and seat members (13), (14). The backrest slides and pivots with respect to the frame and is pivotally attached to the seat. Pivot blocks (34) fixed to the seat underside selectively engage a frame bearing shaft (24) to hold the backrest and seat and any of several adjustments while holding the included angle between seat and backrest relatively uniform and keeping the seat index point relatively low.

1 Claim, 4 Drawing Sheets

SUSPENSION SEAT FOR VEHICLES WITH RESTRICTED OPERATOR ENVIRONMENT

TECHNICAL FIELD

This invention relates generally to vehicle seats. More particularly this invention relates primarily to seats for fork lifts and the like which provide limited space for the operator.

BACKGROUND ART

A large class of vehicles have configurations dictated by the vehicle function which result in the vehicle operator's space being quite limited in at least some dimensions. For example, roll bar cages often are required for forklift trucks. The practicalities of transporting these vehicles, and of the areas in which these vehicles are operated, place constraints on the height of the roll bar cage. The operating environment may place other constraints on the size of the vehicle such that various vehicle components, for example, batteries or the like, have to be placed close to the operator's space. To provide room for the operator, seats frequently are placed directly upon the top surface of the vehicle, and such things as shock absorbing and adjustment structures become desired amenities which must be left out. Accordingly, an improved manner of seating vehicle operators in such cramped quarters is desired.

DISCLOSURE OF INVENTION

Responding to the needs described above, this invention provides a seat with tubular frame disposed generally at the periphery of the seat. The back cushion assembly at a lower end is pivotally attached to the rear of a seat cushion assembly and at an upper end slidably and pivotally coupled to the frame. The front end of the seat cushion assembly is pivotally mounted to the frame. The fork truck operator grasps and elevates the front of the seat cushion to move it between several settings for mounting on the frame.

It is an object of this invention to provide an improved seat for use in vehicles having a cramped operator environment, such as fork trucks.

Another object is to provide an improved suspension seat for use in fork trucks and the like.

Another object is to provide a suspension seat having a very low seat index point.

Yet another object is provision of a seat which enables the fork truck operator to more readily keep lower legs and feet on the vehicle foot controls.

Also an object is maintaining the included angle between the seat cushion assembly and the back rest assembly at a more constant value thereby providing a more securely seated operator and minimizing operator feelings of falling out of the seat.

These objects and other features and advantages of this invention will become readily apparent upon referring to the following description in conjunction with the drawings.

BRIEF DESCRIPTION OF THE DRAWINGS

The suspension seat invention is illustrated in the drawings wherein.

BEST MODE FOR CARRYING OUT THE INVENTION

Figure 1:
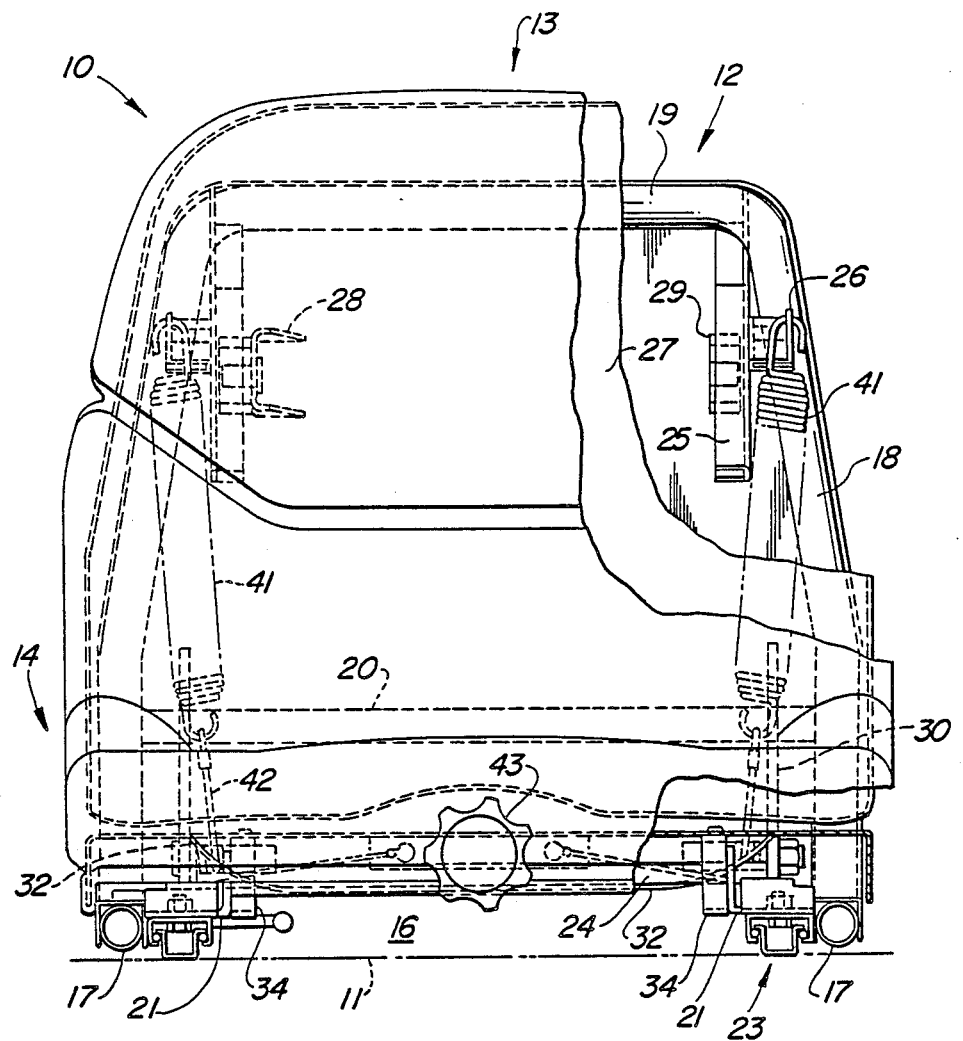
FIG. 1 is a front elevational view of the seat, portions thereof being cut away to reveal structural features of the seat.
Figure 2:
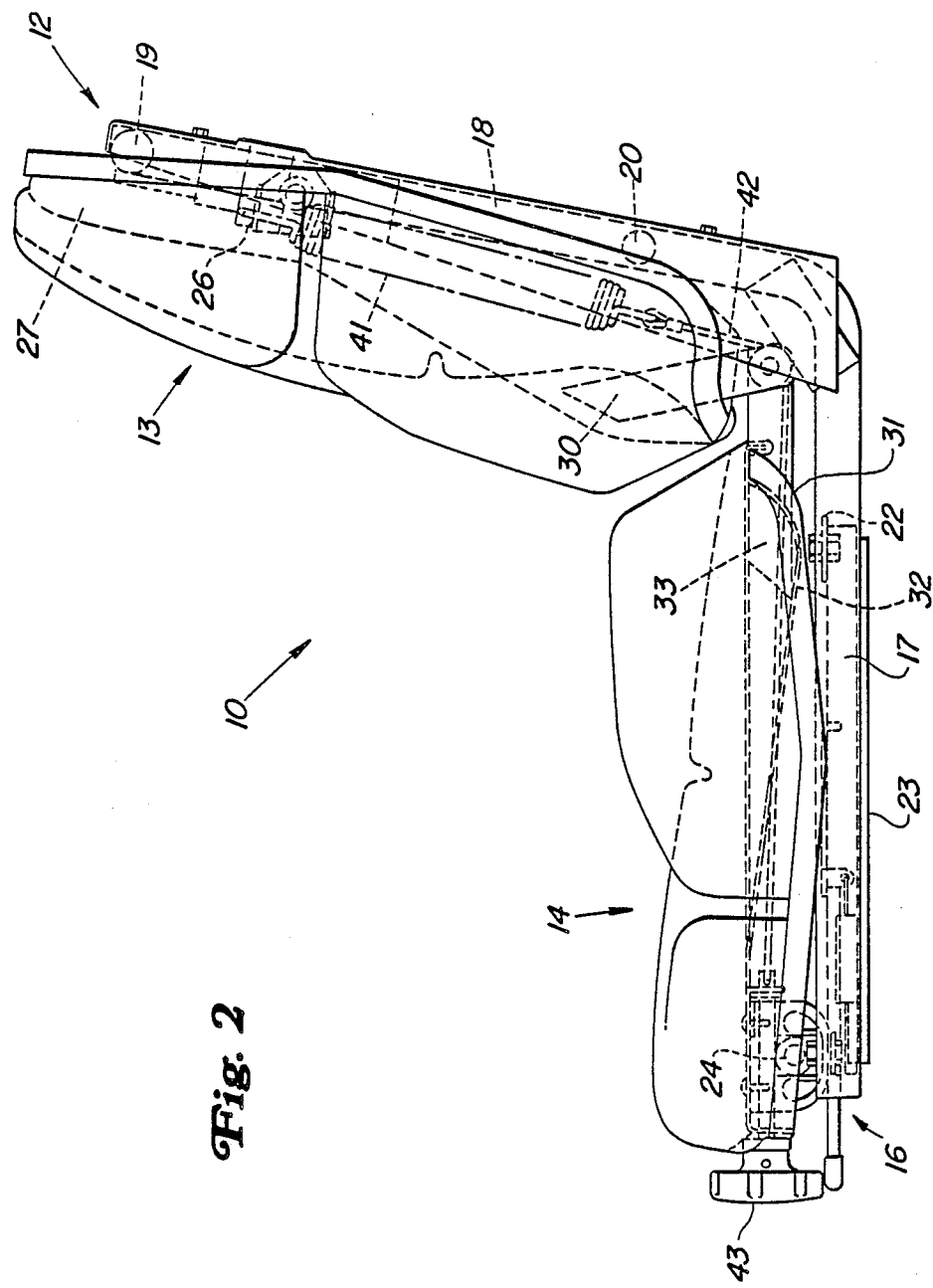
FIG. 2 is a side elevational view of the seat.
Figure 3:
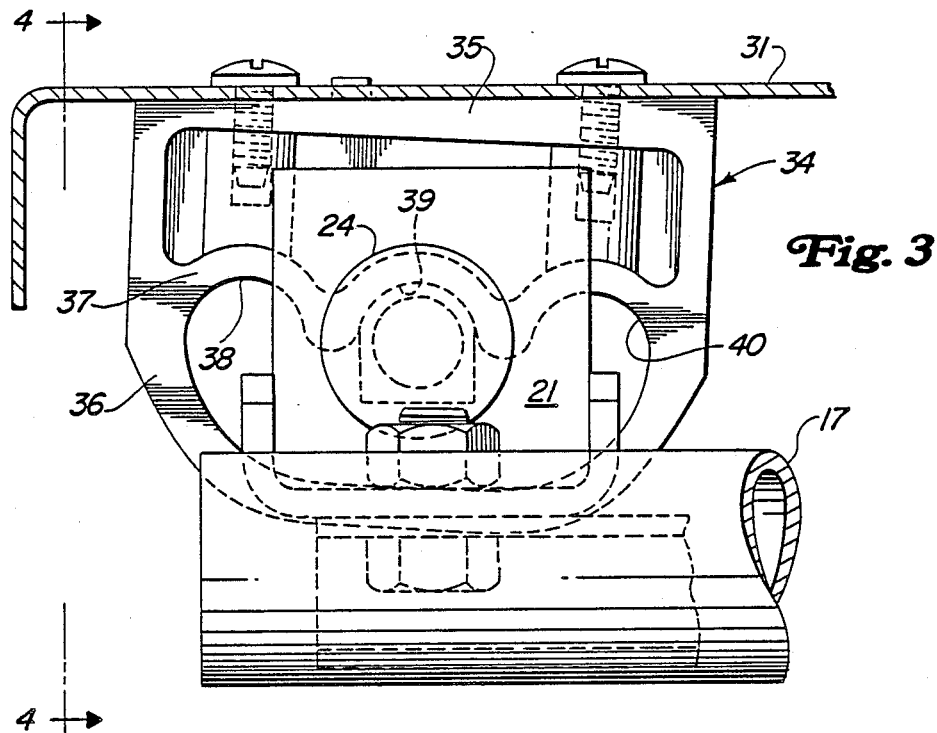
FIG. 3 is an enlarged, fragmentary side elevational view with portions of the seat cut away to reveal the front pivot block structure.
Figure 4:
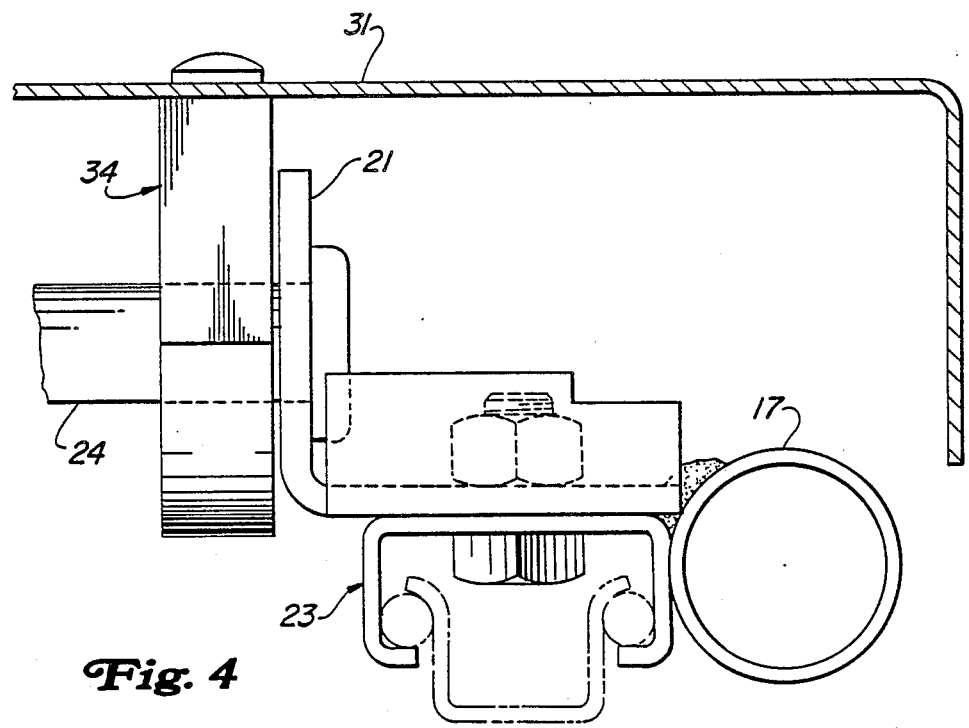
FIG. 4 is an enlarged, fragmentary front elevational view with portions of the seat cut away to show the pivot block structure.
Figure 5:
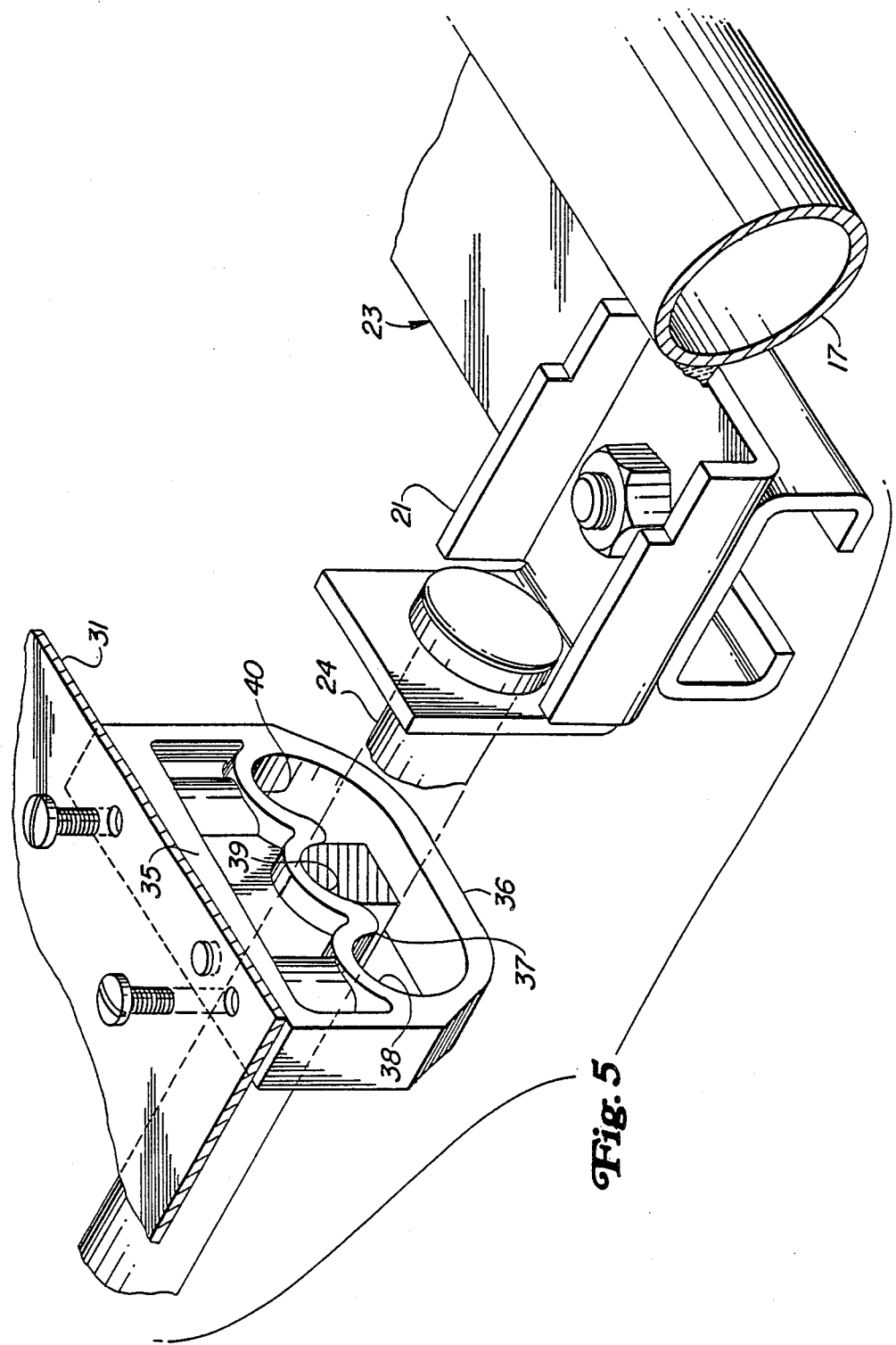
FIG. 5 is an enlarged, exploded, fragmentary perspective view showing the pivot block structure.

The suspension seat invention is shown generally at (10) mounted to the surface (11) of a fork truck or the like. The seat (10) more particularly includes a tube frame assembly (12), back cushion assembly (13) and seat cushion assembly (14).

The frame assembly (12) preferably is composed of tubular elements and has the general configuration of an inverted "U", the open end (16) being disposed to the front (see FIG. 1). Extending back from the front (16) are horizontally disposed frame portions (17) which are generally parallel and transversely spaced apart. To the rear and contiguous with portion (17) are upright frame portions (18) again generally parallel and transversely spaced apart. The upper ends of frame portions (18) are connected by a contiguous top crossing portion (19). The portions (18) are connected also, intermediate their ends, by transverse torsion tubes (20).

L-shaped front supports (21) are fixed to the inside of frame portion (17) adjacent front (16) and extend toward each other. Second, horizontal supports (22) also are fixed to the insides of, and intermediate the ends of, portion (17). The horizontal components of supports (21), (22) attach to a conventional slide set (23) whereby the frame (12) is joined to the vehicle (11). A bearing shaft (24) extends transversely between the upright components of supports (21).

The frame assembly (12) includes an elongated slider channel (25) fixed to each upright portion (18) adjacent crossing portion (19). The channels (25) are generally C-shaped in cross section and are disposed parallel to each other and in the plane defined by portions (18). Spring mounting brackets (26) are fixed between each channel (25) and portion (18).

The back cushion assembly (13) includes a back rest pan (27). A pair of transversely spaced mounting brackets (28) are carried adjacent the upper end of pan (27). Block sliders (29) are pivotally attached to each bracket (28) by means of roller pins and slidably engage the channels (25) of frame (12). Transversely spaced back pivot brackets (30) extend downwardly from the pan (27). The frame members (18), (19) are disposed adjacent the periphery of the back cushion assembly (13).

The seat cushion assembly (14) includes a seat pan (31). Formation of the pan (31) is such that the bottom surface (32) thereof, located interiorly from the periphery of the pan (31), extends downwardly toward the vehicle surface (11) and between the frame members (17) which are disposed adjacent the periphery of the seat cushion assembly (14). Transversely spaced seat pivot brackets (33) extend from the rear of pan (31) and pivotally couple to brackets (30).

The seat cushion assembly (14) further includes a pair of transversely spaced, parallel pivot blocks (34) depending from the underside of the front of pan (31). Each block (34) includes an elongated wedge-shaped portion (35) which increases continuously in thickness from the front end to the rear end thereof. The portions

(35) are fixed directly to the underside of pan (31) and have depending therefrom loop members (36) which together with portions (35) define enclosed spaces. Extending between portions of the loop member (36) and spanning the enclosed spaces are serpentine notch forming members (37), front, middle and rear notches (38), (39), (40) being formed thereby. The notch forming members (37) are disposed generally parallel to the undersides of wedge portions (35) thereby causing the front notch (38) to be disposed somewhat closer to pan (31) and rear notch (40) somewhat farther from pan (31), than middle notch (39). The bearing shaft (24) passes through the enclosed spaces and is engaged by the notch forming members (37).

A standard suspension includes suspension springs (41) extending from the mounting brackets (26) of frame (12) to spring adjustment cables (42) which in turn are attached to the weight adjustment mechanism (43) fixed to the underside of seat pan (31). A shock absorber (not shown) when employed may extend from the frame top crossing portion (19) to the back rest pan (27).

The operator grasps the front of seat cushion assembly (14) and lifts. The notch forming members (37) thereby disengage from bearing shaft (24). The operator then can reset the seat adjustment by moving the seat cushion assembly (14), then dropping it such that the bearing shaft (24) again is engaged by one of the sets of notches (38), (39), (40). The seat cushion assembly (14) pivots with respect to the back cushion assembly (13), and the assembly (13) pivots with respect to the frame assembly (12) as the adjustment is made. Although the front pivot blocks (34) shown herein provide for three settings, it should be understood that these blocks can be made to provide for other combinations of settings.

The included angle between the seat cushion assembly (14) and back cushion assembly (13) is maintained at a more constant value as the seat is adjusted. This results in the operator feeling more secure in the seat. Furthermore, a low seat index point is maintained, the operator's hips being close to the vehicle mounting surface. Due to the cramped space between the vehicle surface and such things as overhead roll bar protection which cannot be raised due to shipping constraints, this results in greater comfort for the operator and facilitates more effective operation of the vehicle. This low seat index point is retained not withstanding incorporation of a suspension into the seat.

The industrial applicability of this seat invention is believed to be apparent from the foregoing description. Although a preferred embodiment has been disclosed herein, it is to be remembered that various alternate constructions can be made thereto without departing from the scope of this invention.

We claim:

1. A suspension seat, comprising:

frame means having leg frame portions, generally upright frame portions contiguous with said let frame portions, and support bar means spanning said leg frame portions;

backrest means slidably and pivotally attached to said upright frame portions;

seat means pivotally attached to said backrest means; and pivot block means attached to said set means and selectively engageable with said support bar means to alter the position of said backrest and seat means, said pivot block means including serpentine means for providing a plurality of engagement points, said serpentine means resting upon said support bar means and being elevatable and movable to alter which of said plurality of engagement points bear against said support bar means, and said serpentine means is disposed at such an angle to said seat means that said engagement points are spaced successively farther from said seat means as they are spaced closer to said backrest means, whereby the included angle between said seat and backrest means is maintained at a more constant value during seat adjustments.

* * * * *